United States Patent
Naidu et al.

(10) Patent No.: US 10,161,319 B2
(45) Date of Patent: Dec. 25, 2018

(54) METHOD AND SYSTEM TO PROVIDE ENGINE TORQUE

(71) Applicant: FORD GLOBAL TECHNOLOGIES, LLC, Dearborn, MI (US)

(72) Inventors: Ashish Kumar Naidu, Basildon (GB); Steve Johnson, Brentwood (GB); Peter George Brittle, Romford (GB); James Wright, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 15/400,115

(22) Filed: Jan. 6, 2017

(65) Prior Publication Data

US 2017/0198647 A1    Jul. 13, 2017

(30) Foreign Application Priority Data

Jan. 7, 2016  (GB) .................................. 1600256.0

(51) Int. Cl.
| | |
|---|---|
| F02D 23/00 | (2006.01) |
| F02B 37/007 | (2006.01) |
| F02D 35/02 | (2006.01) |
| B60K 6/485 | (2007.10) |
| B60W 20/00 | (2016.01) |
| F02B 37/013 | (2006.01) |

(Continued)

(52) U.S. Cl.
CPC ................ *F02D 23/00* (2013.01); *B60K 6/24* (2013.01); *B60K 6/26* (2013.01); *B60K 6/485* (2013.01); *B60W 20/00* (2013.01); *F02B 37/007* (2013.01); *F02B 37/013* (2013.01); *F02D 35/02* (2013.01); *B60Y 2200/92* (2013.01); *Y02T 10/144* (2013.01); *Y02T 10/6226* (2013.01); *Y10S 903/905* (2013.01); *Y10S 903/906* (2013.01)

(58) Field of Classification Search
CPC ........... F02D 23/00; F02D 35/02; B60K 6/26; B60K 6/24; B60K 6/485; F02B 37/013; Y10S 903/905; Y10S 903/906; B60Y 2200/92
USPC .................................. 60/605.1, 605.2, 605.3
See application file for complete search history.

(56) References Cited

U.S. PATENT DOCUMENTS

| | | | |
|---|---|---|---|
| 4,958,497 A | 9/1990 | Kawamura | |
| 5,771,868 A | 6/1998 | Khair | |

(Continued)

FOREIGN PATENT DOCUMENTS

| | | |
|---|---|---|
| EP | 2206904 | 7/2010 |
| JP | 2005198412 | 7/2005 |

(Continued)

OTHER PUBLICATIONS

An, Shibata, Suzuki, and Ebisu, Development of Two-Stage Electric Turbocharging system for Automobiles, Mitsubishi Heavy Industries Technical Review, vol. 52, No. 1, Mar. 2015.

(Continued)

*Primary Examiner* — Hoang Nguyen
(74) *Attorney, Agent, or Firm* — Carlson, Gaskey & Olds, P.C.

(57) ABSTRACT

An exemplary method of providing torque-assist to a crankshaft of an internal combustion engine includes, among other things, assisting a rotation of the crankshaft using an electric machine during the transition between stages of a multi-stage forced induction system.

20 Claims, 2 Drawing Sheets

(51) Int. Cl.
 *B60K 6/24* (2007.10)
 *B60K 6/26* (2007.10)

(56) References Cited

U.S. PATENT DOCUMENTS

| | | | |
|---|---|---|---|
| 8,959,912 B2 | 2/2015 | Hoess et al. | |
| 2008/0047268 A1* | 2/2008 | Isogai | F02B 37/10 60/608 |
| 2010/0300383 A1* | 12/2010 | Pursifull | F02B 69/06 123/21 |
| 2012/0152214 A1* | 6/2012 | Thorne | F02B 37/013 123/564 |
| 2015/0034408 A1* | 2/2015 | Wu | F02B 37/002 180/309 |
| 2016/0003130 A1* | 1/2016 | Brinkmann | F02D 41/1448 60/602 |
| 2016/0102604 A1* | 4/2016 | Wu | F02B 37/002 180/309 |

FOREIGN PATENT DOCUMENTS

| | | |
|---|---|---|
| JP | 2007205265 | 8/2007 |
| JP | 2008255902 | 10/2008 |
| JP | 2010048225 | 3/2010 |
| WO | 9854449 | 12/1998 |
| WO | 2012057191 | 5/2012 |
| WO | 2013004595 | 1/2013 |

OTHER PUBLICATIONS

Search and Examination report for Application No. GB1600256.0 dated Jul. 12, 2016.

* cited by examiner

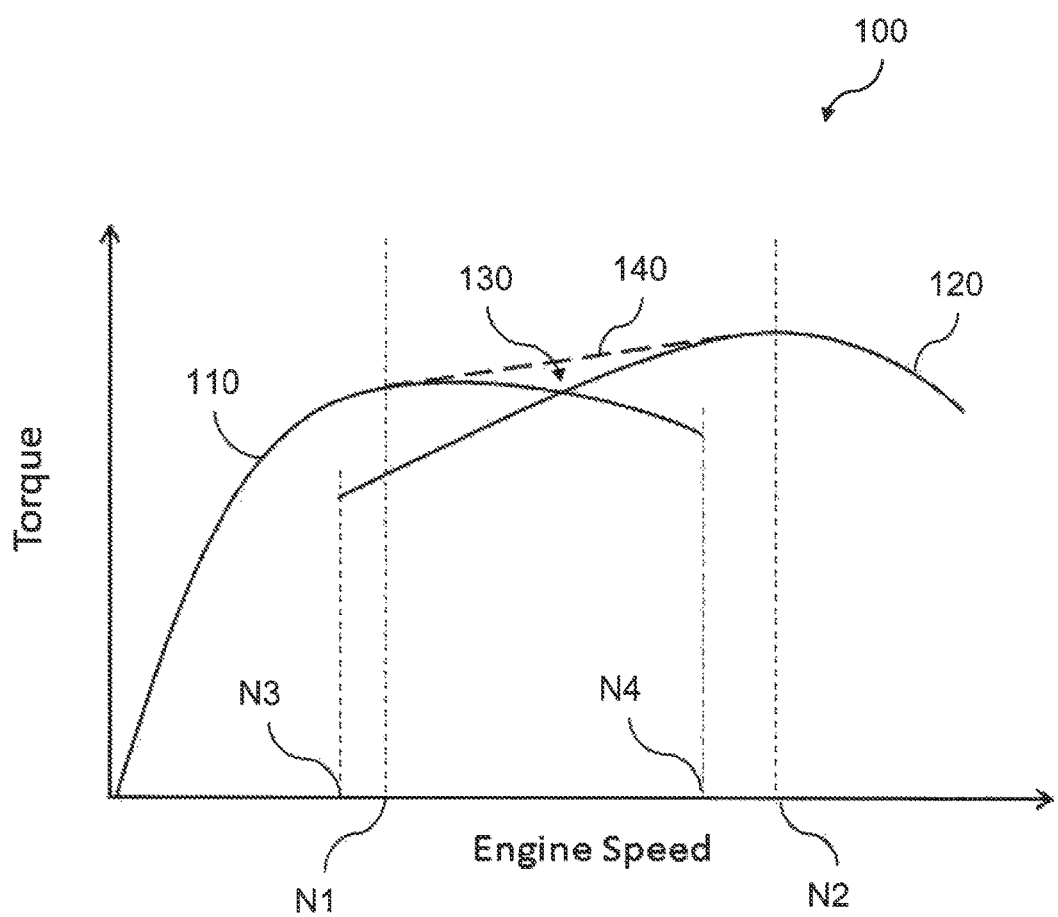

METHOD AND SYSTEM TO PROVIDE ENGINE TORQUE

This application claims priority to GB Patent Application No. 1600256.0, which was filed on Jan. 7, 2016, the entire contents of which are expressly incorporated herein by reference.

TECHNICAL FIELD

This disclosure relates to a method of providing torque-assist to a crankshaft of an internal combustion engine, and in particular, but not exclusively, relates to providing torque-assist to a turbocharged internal combustion engine.

BACKGROUND

Engines can be fitted with a turbocharger system to increase the performance of the engine. For multi-stage series turbocharger systems, a trade-off exists between the maximum power that can be achieved from the engine at high engine speed and the maximum torque that can be achieved in the mid speed range. Such a problem is commonly known as "mid-speed torque dip".

Where a low pressure (LP) stage of the turbocharger system is configured to deliver a high flow capacity, a high power output can be achieved at the expense of the torque dip in the mid-speed range. Conversely, where the LP stage of the turbocharger system is configured to deliver a low flow capacity, the torque dip can be eliminated but at the expense of maximum power output.

SUMMARY

According to an aspect of the present disclosure there is provided a method of providing torque-assist to a crankshaft of an engine, for example an internal combustion engine. The method comprises assisting the rotation of the crankshaft using an electric machine during the transition between the stages of a multi-stage forced induction system, for example a series multi-stage turbocharger system. The torque-assist may be provided by inputting torque directly to the crankshaft of the engine. By assisting the rotation of the crankshaft during the transition between the stages of the multi-stage forced induction system, the torque response of the engine is improved and the back pressure, for example in an exhaust system of the engine, may be reduced. The crankshaft may be driven by the electric machine to reduce, for example smooth, the torque dip during the transition between the stages of a multi-stage forced induction system. The method may comprise providing torque-assist to another rotary shaft of an engine, for example a camshaft, a balancer shaft, and/or any other appropriate rotary shaft of the engine to reduce, for example smooth, the torque dip during the transition between the stages of a multi-stage forced induction system.

The method may comprise activating the electric machine when a first stage of the forced induction system reaches a peak performance level. The peak performance level may correspond to a peak boost level, i.e. a peak power output, that can be produced by the first stage of the forced induction system. The peak performance level may correspond to a peak efficiency level of the first stage of the forced induction system.

The method may comprise activating the electric machine when a second stage of the forced induction system is activated. For example, the forced induction system may comprise one or more bypass valves, which are configured to divert gas flow within the forced induction system. As such, the method may comprise activating the electric machine when a bypass valve operates to divert gas flow to the second stage of the forced induction system.

The method may comprise deactivating the electric machine when the second stage of the forced induction system reaches a peak performance level. The peak performance level may correspond to a peak boost level, i.e. a peak power output, that can be produced by the second stage of the forced induction system. The peak performance level may correspond to a peak efficiency level of the second stage of the forced induction system.

The method may comprise deactivating the electric machine when the first stage of the forced induction system is deactivated. For example, where the forced induction system comprises one or more bypass valves, the method may comprise deactivating the electric machine when a bypass valve operates to divert gas flow away from the first stage of the forced induction system. The bypass valve may be configured to activate and/or deactivate the first stage of the forced induction system. The bypass valve may be configured to activate and/or deactivate the second stage of the forced induction system.

The method may comprise assisting the rotation of the crankshaft only when more than one stage of the forced induction system is activated. For example, the electric machine may be deactivated when only the first stage of the forced induction system is activated. The electric machine may be deactivated when only the second stage of the forced induction system is activated.

The method may comprise assisting the rotation of the crankshaft during a mid speed range of the engine. For example, the electric machine may be deactivated in a speed range between zero and a first engine speed. The electric machine may be activated in a speed range between the first engine speed and a second engine speed. The electric machine may be deactivated in a speed range between the second engine speed and a third engine speed. The electric machine may be deactivated below the first engine speed and above the second engine speed. The mid speed range may be the middle third of the speed range of the engine. The speed range may be defined by a speed range between 0 RPM and a maximum RPM of the engine.

According to another aspect of the present disclosure there is provided a torque-assist system for an engine, for example an internal combustion engine. The torque-assist system comprises: a multi-stage forced induction system; an electric machine coupled to a crankshaft of the engine; and a controller configured to activate the electric machine during transition between the stages of a multi-stage forced induction system to assist the rotation of the crankshaft. The crankshaft may driven by the electric machine to reduce, for example smooth, the torque dip during the transition between the stages of a multi-stage forced induction system.

The multi-stage forced induction system may comprise at least one turbocharger. For example, the multi-stage forced induction system may be a series multi-stage turbocharger system, such as a twin-stage turbocharger system. The electric machine may be coupled to the crankshaft of the engine. The electric machine may be rigidly coupled to the crankshaft of the engine. The electric machine may be coupled to the crankshaft of the engine by virtue of one or more intermediary members, such an accessory drive member. The electric machine may be coupled to the crankshaft at a front end of the engine, for example an end of the engine to which a synchronous drive and/or one or more accessory drives are coupled.

An engine may be provided comprising at least one of the above mentioned torque-assist systems.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 shows a graphical representation of torque output against engine speed for an engine from the FIG. 1 vehicle having a twin-stage series turbocharger system.

DETAILED DESCRIPTION

Figure 1:
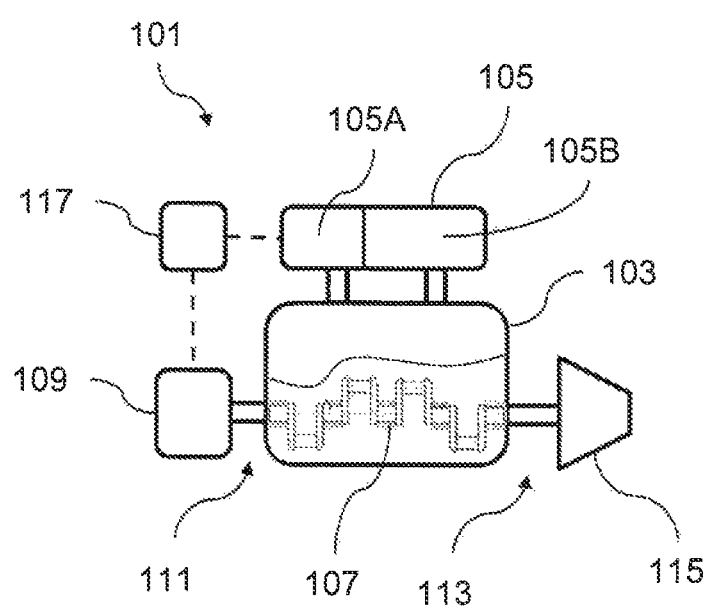
FIG. 1 shows a torque-assist system for a vehicle according to an exemplary embodiment.

FIG. 1 shows a torque-assist system 101 for an engine 103, for example an internal combustion engine of a vehicle, according to an exemplary embodiment. The torque-assist system 101 comprises a multistage forced induction system 105. In the exemplary arrangement shown in FIG. 1, the multistage forced induction system 105 is a twin-stage series forced induction system, which comprises a first stage 105A, for example a high-pressure stage, and a second stage 105B, for example a low-pressure stage. The multistage forced induction system 105 may, however, comprise any appropriate number and/or type of forced induction stages.

FIG. 2 shows graphical representation of the torque output against engine speed for the engine 103 having the twin-stage series turbocharger system and depicts an example operational mode 100 of providing torque-assist to a rotary shaft 107, for example a crankshaft, of the engine 103. In the operational mode 100 shown in FIG. 2, the output torque of the engine 103 is boosted during low to mid engine speeds by the first stage 105A of the turbocharger system, as shown by line 110. During mid to high engine speeds, the output torque of the engine 103 is boosted by the second stage 105B of the turbocharger system, as shown by line 120. The second stage 105B of the turbocharger system is configured to deliver a high flow capacity such that a high torque output can be achieved at higher engine speeds. The downside of providing a second stage 105B having a high flow capacity is that a "torque dip" 130 may be experienced in the mid-speed range during transition between a first stage 105A and the second stage 105B of the turbocharger system.

In order to overcome the torque dip 130, the present disclosure provides a method of assisting the rotation of the rotary shaft 107 of the engine 103 during transition between the stages 105A, 15B of the multistage forced induction system.

As shown in FIG. 1, the torque-assist system 101 comprises an electric machine 109, which is coupled to the rotary shaft 107 of the engine 103. The electric machine 109 may be any appropriate type of electric machine 109 that is configured to assist the rotation of the crankshaft. For example the electric machine 109 may be an electric motor or an electric motor-generator. The electric machine 109 may be directly coupled, for example rigidly coupled, to the crankshaft. In another arrangement, the electric machine 109 may be coupled to the crankshaft by virtue of one or more intermediate members, for example an accessory drive member, such as a gear, a pulley, a drive belt or a drive chain. A clutch (not shown) may be provided in between the electric machine 109 and a crankshaft of the engine 103, such that the electric machine 109 may be selectively engaged and disengaged from the crankshaft depending on the desired operation of the engine 103.

In the arrangement shown in FIG. 1, the electric machine 109 is coupled to a front end 111 of the crankshaft of the engine 103. In the context of the present disclosure, the term "front end" is understood to mean the end of the engine 103 opposite the "rear end" 113, to which a transmission 115 is coupled. As such, the electric machine 109 may be coupled to the end of the crankshaft that extends through the front of the engine casing and which may be configured to drive a synchronous drive of the engine 103. However, in one or more alternative arrangements, the electric machine 109 may be coupled to any appropriate portion of the crankshaft. For example, the electric machine 109 may be coupled to a portion of the crankshaft that extends from the rear end of the engine casing and which may be configured to drive the transmission 115.

The exemplary torque-assist system 101 comprises a controller 117 that is configured to activate and/or deactivate the electric machine 109. The controller 117 may be operatively connected to the turbocharger system 105 such that it is able to determine one or more operational parameters of the first and second stages 105A, 105B of the turbocharger system 105. For example, the controller 117 may be configured to determine at least one of the operational speed of an impeller of the turbocharger system 105, the flow rate of gas through the turbocharger system 105, and a boost pressure of the turbocharger system 105. The controller 117 may be operatively connected to the engine 103 such that the controller 117 is able to determine one or more operational parameters of the engine 103. For example, the controller 117 may be configured to determine the output torque from the crankshaft of the engine 103. In this manner, the controller 117 may be configured to control the operation of the torque-assist system 101 depending on one or more operational parameters of the turbocharger system 105 and/or the engine 103.

In the example mode of operation 100 shown in FIG. 2, the controller 117 is configured to activate the electric machine 109 when the first stage 105A of the turbocharger system 105 reaches a peak output level, which occurs at an engine speed N1. The controller 117 is configured to deactivate the electric machine 109 when of the second stage 105B of a turbocharger system 105 reaches a peak output level, which occurs at an engine speed N2. Line 140 of FIG. 2 illustrates the period for which the electric machine 109 is activated. In this manner, as the performance of the first stage 105A starts to fall off, the electric machine 109 provides torque-assist to the crankshaft in order to compensate for the torque dip experienced during transition to the second stage 105B. The electric machine 109, therefore, provides torque-assist to the crankshaft in an engine speed range correlating to a range defined by the respective peaks in the performance of the first and second stages 105A, 105B of the turbocharger system 105.

In an alternative mode of operation, the activation of the electric machine 109 may be linked to the performance curve 120 of the second stage 105B in addition to or instead of the performance curve 110 of the first stage 105A. For example, the point at which the electric machine 109 is activated may be determined by a function derived from the performance curve 110 of the first stage 105A and the performance curve 120 of the second stage 105B.

In a similar manner, the deactivation of the electric machine 109 may be linked to the performance curve 110 of the first stage 105A in addition to or instead of the performance curve 120 of the second stage 105B. For example, the point at which the electric machine 109 is deactivated may be determined by a function derived from the performance curve 110 of the first stage 105A and the performance curve 120 of the second stage 105B.

In some configurations, the turbocharger system 105 may be configured to selectively activate and/or deactivate one or more of the stages of the turbocharger system 105. For example, the turbocharger system 105 may comprise one or more bypass valves configured to divert gas flow in order to modify the operational output of the turbocharger system 105. The controller 117 may be configured, therefore, to activate and/or deactivate the electric machine 109 depending on the operational state of the stages 105a, 105B. For example, the controller 117 may be configured to activate the electric machine 109 when the engine 103 reaches an operational speed N3, which correlates to the activation of the second stage 105B of a turbocharger system 105. In a similar manner, the controller 117 may be configured to deactivate the electric machine 109 when the engine 103 reaches an operation speed N4, which correlates to the deactivation of the first stage 105A of the turbocharger system 105.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A method of providing torque-assist to a crankshaft of an internal combustion engine, the method comprising:
   assisting a rotation of the crankshaft using an electric machine during the transition between stages of a multi-stage forced induction system.

2. The method of claim 1, further comprising activating the electric machine when a first stage of the forced induction system reaches a peak performance level.

3. The method of claim 2, further comprising deactivating the electric machine when a second stage of the forced induction system reaches a peak performance level.

4. The method of claim 1, further comprising activating the electric machine when a second stage of the forced induction system is activated.

5. The method of claim 4, further comprising deactivating the electric machine when a first stage of the forced induction system is deactivated.

6. The method of claim 1, further comprising deactivating the electric machine when a second stage of the forced induction system reaches a peak performance level.

7. The method of claim 1, further comprising deactivating the electric machine when a first stage of the forced induction system is deactivated.

8. The method of claim 1, further comprising assisting the rotation of the crankshaft during only a middle portion of the speed range of the engine.

9. The method of claim 1, further comprising assisting the rotation of the crankshaft only when more than one stage of the forced induction system is activated.

10. A torque-assist system for an internal combustion engine, the torque-assist system comprising:
    a multi-stage forced induction system;
    an electric machine coupled to a crankshaft of the engine; and
    a controller configured to activate the electric machine during transition between the stages of a multi-stage forced induction system to assist the rotation of the crankshaft.

11. The torque-assist system of claim 10, wherein the multi-stage forced induction system comprises at least one turbocharger.

12. The torque-assist system of claim 10, wherein the electric machine is coupled to the crankshaft of the engine by virtue of one or more intermediary members.

13. The torque-assist system of claim 12, wherein the multi-stage forced induction system comprises at least one turbocharger.

14. The torque-assist system of claim 13, wherein the electric machine is coupled to the crankshaft at a front end of the engine.

15. The torque-assist system of claim 10, wherein the electric machine is coupled to the crankshaft at a front end of the engine.

16. An engine comprising the torque-assist system of claim 8.

17. The torque-assist system of claim 10, wherein the controller is further configured to deactivate the electric machine when a second stage of the multi stage forced induction system reaches a peak performance level.

18. The torque-assist system of claim 10, wherein the controller is further configured to activate the electric machine when a second stage of the multi stage forced induction system is activated.

19. The torque-assist system of claim 10, wherein the controller is further configured to deactivate the electric machine when a first stage of the multi stage forced induction system is deactivated.

20. The method of claim 1, further comprising using a controller to control the electric machine when the electric machine is assisting of the rotation of the crankshaft.

* * * * *